(12) United States Patent
Kedem et al.

(10) Patent No.: US 7,099,875 B2
(45) Date of Patent: *Aug. 29, 2006

(54) METHOD AND APPARATUS FOR MAKING INDEPENDENT DATA COPIES IN A DATA PROCESSING SYSTEM

(75) Inventors: Isbay Kedem, Brookline, MA (US); Hana Moreshet, Framingham, MA (US); Douglas E. LeCrone, Hopkinton, MA (US); Bruce A. Pocock, Titusville, FL (US)

(73) Assignee: EMC Corporation, Hopkinton, MA (US)

( * ) Notice: Subject to any disclaimer, the term of this patent is extended or adjusted under 35 U.S.C. 154(b) by 403 days.

This patent is subject to a terminal disclaimer.

(21) Appl. No.: 10/601,359

(22) Filed: Jun. 23, 2003

(65) Prior Publication Data

US 2004/0059882 A1 Mar. 25, 2004

Related U.S. Application Data

(63) Continuation-in-part of application No. 10/073,708, filed on Feb. 11, 2002, which is a continuation of application No. 09/342,608, filed on Jun. 29, 1999, now Pat. No. 6,363,385.

(51) Int. Cl.
*G06F 17/30* (2006.01)

(52) U.S. Cl. .................. 707/10; 707/201; 707/202; 707/204; 714/6; 711/162

(58) Field of Classification Search .................. 707/10, 707/201, 202, 204
See application file for complete search history.

(56) References Cited

U.S. PATENT DOCUMENTS

| | | | |
|---|---|---|---|
| 4,866,611 A | 9/1989 | Cree et al. | 364/300 |
| 5,434,994 A | 7/1995 | Shaheen et al. | 395/500 |
| 5,596,706 A | 1/1997 | Shimazaki et al. | 395/182.04 |
| 5,991,859 A * | 11/1999 | Nagasawa et al. | 711/170 |
| 6,101,497 A | 8/2000 | Ofek | 707/10 |
| 6,363,385 B1 * | 3/2002 | Kedem et al. | 707/10 |
| 6,457,109 B1 * | 9/2002 | Milillo et al. | 711/162 |
| 6,542,909 B1 * | 4/2003 | Tamer et al. | 707/205 |
| 6,886,086 B1 * | 4/2005 | Kobayashi et al. | 711/162 |
| 2002/0073090 A1 * | 6/2002 | Kedem et al. | 707/10 |
| 2003/0167312 A1 * | 9/2003 | Mori | 709/212 |

* cited by examiner

*Primary Examiner*—Hong Kim
(74) *Attorney, Agent, or Firm*—George A. Herbster

(57) ABSTRACT

A method for copying data from a source disk storage device to a destination disk storage device. In response to a copy command from a requesting host application identifying the storage locations in source and destination disk storage devices, an environment is established. Thereafter a calling system receives an immediate response that the copy operation is complete even though no data has been copied. Application programs may access storage locations in either the source or the destination disk storage device during the copy phase. A copy program transfers the date on a track-by-track basis to the storage locations in the destination disk storage device. Procedures assure that any data access to a particular track in either the source or destination disk storage devices by any application prior to the transfer of that track are accommodated to maintain data integrity.

8 Claims, 15 Drawing Sheets

| CALL FROM DESTINATION DEVICE | CALL FROM SOURCE DEVICE |
|---|---|
| SOURCE DEVICE NUMBER | DESTINATION DEVICE NUMBER |
| RECORD NUMBER OF STARTING EXTENT | CYLINDER ADDRESS OF DESTINATION DEVICE |
| RECORD NUMBER OF ENDING EXTENT | HEAD IDENTIFIER OF DESTINATION DEVICE |

FIG. 4

METHOD AND APPARATUS FOR MAKING INDEPENDENT DATA COPIES IN A DATA PROCESSING SYSTEM

CROSS-REFERENCE TO A RELATED APPLICATIONS

This is a continuation-in-part of U.S. patent application Ser. No. 10/073,708 filed Feb. 11, 2002 for Method and Apparatus for Making Independent Data Copies in a Data Processing system that is a continuation of U.S. patent application Ser. No. 09/342,608 filed Jun. 29, 1999 for Method for Making Independent Data Copies in a Data Processing System, now U.S. Pat. No. 6,363,385 granted Mar. 26, 2003 which application is assigned to the same Assignee as this application.

BACKGROUND OF THE INVENTION

1. Field of the Invention

This invention generally relates to data storage in data processing systems and more particularly to a method for copying data from one storage device to another storage device.

2. Description of Related Art

Copying data from one location, commonly a "source location" to a second or "destination location" is well known in the art. In some situations copying provides data redundancy. In other situations providing two or more copies enables a like number of independent applications or procedures to process the copied data independently.

In one conventional approach, as particularly well known in the use of personal computers, copying is performed on a file-by-file basis between different logical volumes or between different directories on the same logical volume. The conventional device utilizes a "copy" command that specifies a path to a source and file to be copied and a path to a destination location. The processor then copies the data from the source to the destination location. During the copy process no application can access the data at either the source location or the destination location.

In other systems involving larger and more sophisticated data storage facilities, applications may operate on multiple host processors. Such facilities often have the capability of performing copying independently of other host applications. That is, while data is being copied from a source to a destination, other programs or processes can operate on data in locations other than the source or destination file locations. However, in these systems any access to the source file or the destination file is precluded until such time the copy has been completed.

In such systems data can be identified either by physical or logical addresses. Physical addressing includes the identification of device number, a track number and a record number. Logical addressing refers to a logical volume, a file and in some instances a record. Each of these elements has a "granularity", a term of differing values. For the physical device granularity, from the coarsest to the finest granularity is ranked as a physical disk, a track, a sector and a record; in logical devices, the element ranking is logical volume, file and record.

Data processing systems have evolved into two arbitrary classes, namely: "mainframe systems" and "open systems". Generally speaking "mainframe systems" refer to larger IBM and IBM-like data processing systems with a powerful set of internal input-output commands that use CKD (Count-Key-Data) data formatting. "Open systems" refer to other data processing systems that operate with different internal input-output commands and different internal protocols and an FBA (Fixed Block Architecture).

Initially large capacity data storage devices were configured for operation with mainframe systems because at the time they were the only systems that had the power and storage capacity to handle large data sets. These systems also provided a track level of control. These systems have several ways to copy data from one location to another. For example, U.S. Pat. No. 6,101,497 discloses a process for obtaining a single copy of data by logical volume essentially independently of normal processing. However, this process requires a specially configured logical storage device called a BCV device.

More recently, however, open systems have become popular particularly with advances in networking and hardware capabilities. However open systems generally make copies on a file-by-file basis where one logical volume is involved. However, they do not have commands with the capability of handling data on a track-by-track basis. In recent times, the need for making single or multiple copies essentially independently of normal processing has become more desirable even in open systems. Moreover, it has become desirable to transfer entire logical volumes even to copy a subset because in open systems logical volume transfers can actually occur more quickly because it is not necessary to incur the overhead of finding data blocks associated with a single file which can be at any arbitrary position in a logical volume.

What is therefore needed is a method adapted for both mainframe systems and open systems for copying data from a source to a destination independently essentially of any processor operation with a minimal delay between the processing of a copy command initiating a copy process and the availability of both the source and destination locations for processing by different applications.

SUMMARY

Therefore it is an object of this invention to provide an improved method for copying data from a source to a destination in a data storage facility that is useful in mainframe and open systems.

Another object of this invention is to provide an improved method of copying data from a source location to a destination location that occurs essentially independently of any host processes in both mainframe and open systems.

Still another object of this invention is to provide an improved method of copying data from a source to a destination with a minimum interruption to the interaction of processes operating on the source locations and the initiation of operations with the destination locations in both mainframe and open systems.

In accordance with this invention a data processing system includes a host device for generating commands during the processing of a host application. A host application has the capability of generating a command to initiate a process by which data is copied from predetermined source storage locations to predetermined destination storage locations. This method initially establishes an operating environment by identifying the data in source storage locations and the predetermined destination storage locations. A message is sent to the host application indicating that the copying has occurred whereupon the source and destination storage locations become available for use. Thereafter copying of the data from the predetermined storage locations begins and proceeds in an ordered manner while maintaining a record that indicates data that has been transferred.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 4 is a data structure for a request that is useful in this invention as applied to a mainframe system;

DESCRIPTION OF ILLUSTRATIVE EMBODIMENTS

Figure 1:
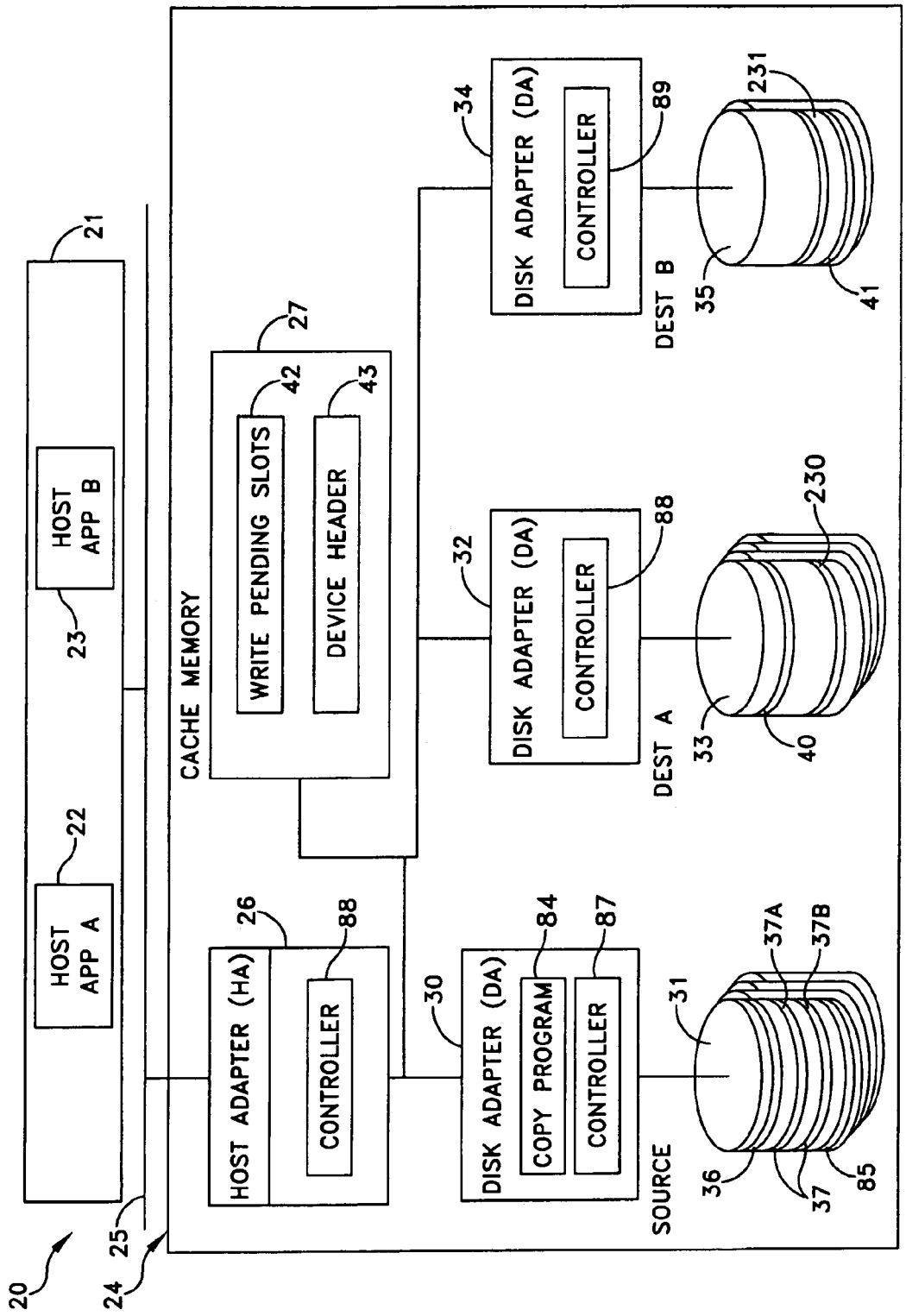
FIG. 1 is a block diagram of a data processing system, including a data storage facility, adapted for implementing this invention in either a mainframe or open system.

FIG. 1 depicts a data processing system 20 in which a host array 21 with one or more host devices controls operations. The host array 21 can comprise either mainframe systems or open systems. Each host device processes a program and in the following discussion "host application" means a particular application program, procedure, process, module or the like being processed on a host. FIG. 1 depicts two such applications, namely: a HOST APP A application 22 and a HOST APP B application 23.

Each host application accesses and processes data stored in a data storage facility 24 over a system bus 25 that can take any of several known forms including single and parallel bus structures. For purposes of this explanation the data storage facility 24 can be considered to store all the data that will be processed either by HOST APP A application 22 or HOST APP B application 23.

This invention can be implemented in a number of disk storage facilities of different types and configurations. The following description is made in the context of a specific data storage facility 24, namely a Symmetrix disk array storage device (DASD). However, the adaptation of the specifically described embodiments for implementing the invention with other data storage devices will be readily apparent to persons of ordinary skill in the art.

A Symmetrix disk array storage device as a data storage facility 24 includes a host adapter 26 and a cache memory 27 that communicate with each other and with a series of disk adapters and physical disk drives. FIG. 1 depicts, for example, a first disk adapter (DA) 30 with an array of physical disks that store one or more logical volumes including a logical volume 31; a disk adapter 32, a logical volume 33; and a disk adapter 34, a logical volume 35. While the configuration of data is entirely arbitrary, for purposes of explaining this invention it is assumed that a physical device stores a logical volume. As is known, however, a logical volume may comprise a portion of a single physical device, a complete physical device, portions of multiple physical devices or even multiple complete physical devices. Such logical devices may also contain discrete data sets or files. FIG. 1 depicts a first file 36 in a set of contiguous data tracks and a file 37 located in two separated sets 37A and 37B of contiguous data tracks.

In accordance with this invention, mainframe systems have the capability of defining a block of data with a granularity that is finer than a logical volume. In open systems, the copy commands are generally limited to logical volumes. For mainframe systems it is possible to transfer the file 36 to a predetermined file location 40 in the logical volume 33 and the file 37 into a set of contiguous locations 41 in the logical volume 35 does not require the transfer of all the data in the logical volume 31. Rather, only the data in file 36 will transfer to the logical volume 33 and only the data in the file 37 will transfer to the locations in the logical volume 35. For open systems, the corresponding transfers would copy the data in the logical volume 33. Obviously if an open system were configured with each file being located in a single logical volume, the open system transfer would have the same capability as the mainframe system transfer.

For purposes of these two specific transfers in a mainframe system, the logical volume 31 is a source and so is termed a source storage device or source disk storage device 31 while the logical volumes 33 and 35 are destinations and are termed a DEST A device 33 and a DEST B device 35 to designate them as destination storage devices or destination disk storage devices.

Assume the HOST APP A application 22 processes data in the file 36. That application or any other host application as a requesting host application could then determine a need to make a copy of that file at the storage locations 40 in the DEST A device 33 for use by the HOST APP B application 23. The requesting host application achieves this result by issuing a special copy command (e.g., a FILE SMMF command). For a mainframe system one version of this command identifies a file in a source device, such as the file 36 and a destination for that file, such as the storage location 40 in the DEST A device 33. For an open system another version of this copy command defines a logical volume. For purposes of the following discussion, it will be assumed that such a configuration exists, so that "file 36", the example, means a "file" in a mainframe context and a "logical volume" in an open system context.

The requesting host application and the host adapter 26 interact to establish an operating environment by, among other things, identifying storage locations in the source and destination storage devices for the transfer as will be described in greater detail with respect to FIG. 5. During the time required to establish the operating environment, normally, within a few milliseconds, the source storage device 31 and DEST A storage device 33 may be locked; they are not available to any host application including the requesting host application. However, as soon as the environment is established and the host adapter produces an internal command for producing the copy, the source storage device 31 and DEST A storage device 33 are enabled to communicate with any host applications. For example, the HOST APP A and HOST APP B applications 22 and 23 might be enabled to interact with the file 36 and the copy at the storage location 40. As described later, an alternative makes it possible to complete all preparatory work in a background mode. If this occurs, the duration of any lock can be reduced dramatically.

Immediately after the environment is established, there is no valid data in the DEST A storage device 33. However, and again as will be more clearly stated later, both the source and destination storage locations are available for use by host applications. A copy program proceeds in an orderly fashion to copy the data from the source storage locations to the destination storage locations. Any attempt to write data to the file 36 in source storage device 31 or to read or write data from any copy, such as the file copy in the storage locations in the DEST A device 33, produces a priority transfer of relevant data so that the data in the two copies of the data file are maintained with integrity. After each transfer, the information in the operating environment is updated.

Figure 2:
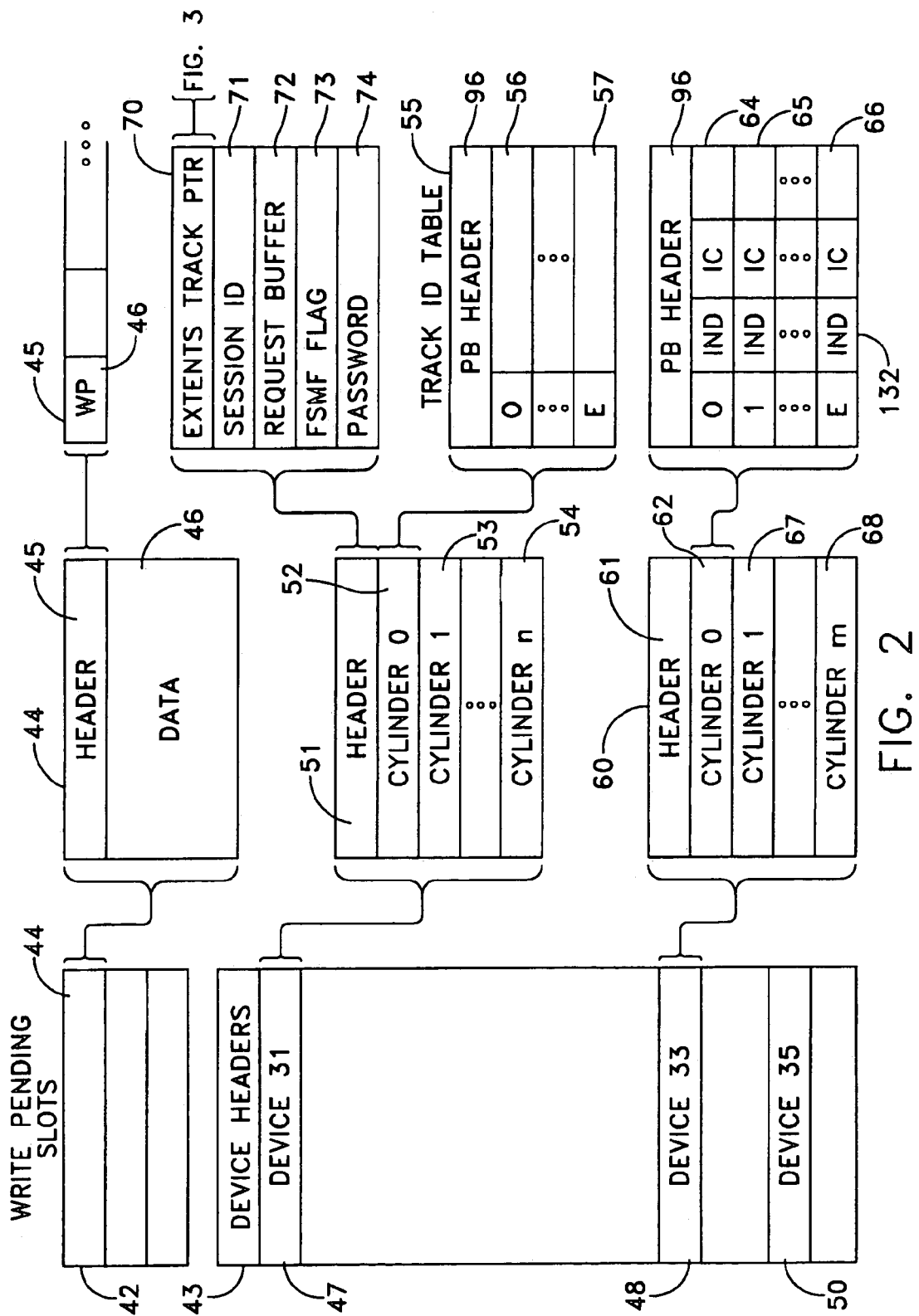
FIG. 2 is a more detailed description of a cache memory shown in FIG. 1 particularly configured for a mainframe system.

FIG. 2 depicts in detail those portions of the cache memory 27 that are relevant to this invention, particularly with respect to write pending slots 42 and device headers 43. Use of data structures within a cache memory as write pending slots and device headers is generally well-known in the art. An individual write pending slot, such as a write pending slot 44, includes a header 45 followed by the data in a data block 46. Normally this data block will contain the data for one physical track. Each header 45 includes a WP flag 46 that indicates a need for write operations or destaging, of data from one of the write pending slots 42 to some location in a physical disk device. Once the data is transferred from the cache memory 27 to a corresponding data storage device, such as the source device 31, the system clears the WP bit 46 for that slot. Each header includes other information that is not relevant to this invention and, accordingly, is not shown.

The device headers 43 will include one entry for each logical device in the Symmetrix DASD. Three such entries are shown, namely: entry 47 for the device 31; entry 48 for device 33; and entry 50 for device 35. Each of these entries has the same organization. That is, the device entry 47 includes a header 51 and a plurality of entries for each cylinder in the device 31. Three specific entries are shown, namely: a Cylinder 0 entry 52, a Cylinder 1 entry 53 and a Cylinder n entry 54.

The header 51 has a structure that is described in further detail later. Each of the cylinder entries, such as Cylinder 0 entry 52, points to a block of locations that define a Track ID table 55 with each location being assigned to a particular track in the cylinder. Two track entries are shown in the Track ID table 55, namely: a Track 0 entry 56 and a Track E entry 57 for individual physical devices in which each cylinder comprises fifteen data tracks.

The device entry 48 comprises a block 60 that includes a header 61 and cylinder entries. FIG. 2 depicts three particular cylinder entries including a Cylinder 0 entry 62 that identifies a Track ID Table. The Track ID Table associated with Cylinder 0 includes, in this particular embodiment, three entries, namely: a Track 0 entry 64, a Track 1 entry 65 and a Track E entry 66. Additional cylinder entries in the block 60 will be included. FIG. 2 depicts two such entries, namely: a Cylinder 1 entry 67 and a Cylinder m entry 68. As will become apparent, n=m or n≠m. The DEST B device entry 50 will have an analogous structure.

Mainframe Systems Implementation

With this background, it will be helpful now to discuss a mainframe system implementation of this invention in its entirety. After that discussion, the common and different processes and operations required for an open system implementation will be described.

Still referring to FIG. 2, the header block 51 for the source device entry 47 includes various items of information that will be interpreted differently depending upon whether a particular device is acting as a source or as a destination device. A header block 51 includes an extent track pointer 70, a session ID entry 71, a request buffer 72, an FSMF flag 73 and a password entry 74. When the header 51 is associated with a source device, the password entry will have a predetermined D value. This value will define the extents track pointer 70 as containing an address to an extents track 75 shown in greater detail in FIG. 3 as comprising a header 76 and one or more extent buffers 77. Details of the header 75 and extent buffers 77 will be described in greater detail later. The FSMF flag 73 indicates whether the device is a destination device as used in this invention or a BCV device as disclosed in U.S. Pat. No. 6,101,497.

A copy program that operates independently of the host processor array 21 is an integral component of this invention. This program operates in response to a command with a particular data structure that is shown in FIG. 4. This structure contains alternate entries depending upon whether the request comes from a source device or a destination device. If the request for destination device operation, a block 81 will contain a source device number; a block 82, the record number for the starting extent; and a block 83, a record number for the ending extent. If the request is for a source device the block 81 contains a destination device number; block 82, a cylinder address for the destination device; and block 83, a head identifier for the destination device. In the specific implementations of this invention, either the source device or destination device can issue the request in a mainframe system. Open systems generally limit requests to the source device.

In the disclosed embodiment, a request, in either form, directs a copy program located in the disk adapter associated with the source device, such as the copy program 84 in the disk adapter 30, to begin a process by which data is copied from the source storage locations to the destination storage locations.

It can be considered that a File SMMF copy command for a mainframe system implementation produce operating phases as follows:

1. a first, or "establish", phase provides an operating environment and begins when a requesting host application issues a "File SMMF" command and ends when a response is sent to the requesting host application indicating that the copy command has been processed. During this phase the requesting host application, the host adapter and source device adapter produce a data structure. In a mainframe system the data structure has an organization as shown as an extents track structure in FIG. 3 for storage in an extents track at a location defined by the requesting host application. As an example, the requesting host application could assign the extents track to a track 85 in the source device 31 in FIG. 1 that then could be accessed by any device. For maximum effectiveness the requesting host application could also set a parameter so that the extents track also resided in the cache memory 27 for the duration of the operation.

2. A second phase, or "copy" that begins when a request for a copy operation is generated and ends when all the data has been copied. During this phase the copy program in the source device duplicates the data on a track-by-track basis in the selected destination storage locations. More specifically, if the File SMMF command in a mainframe system identifies the file 36 as a source and locations 40 as a destination, each track in the file 36 will transfer to locations 40 in sequence. If the File SMMF command identifies the file 37, the copy program will transfer from the two non-contiguous sites 37A and 37B in the source device 31 to the contiguous track locations 41 in the DEST B device 35. During this phase any attempt to access data on either the source or destination device is handled in an expeditious manner. In an open system all the data in a source logical volume is transferred.

3. A modification/termination phase during which the copy operation can be modified or terminated.

In Symmetrix DASD data storage facility system each host adapter, such as host adapter 26, and disk adapter, such as the disk adapters 30, 32 and 34, contains a controller such as a controller 86 in the host adapter 26, a controller 87 in the disk adapter 30, a controller 88 in the disk adapter 32 and a controller 89 in the disk adapter 34. Each such controller has a similar structure and comprises a microprocessor that will include its own random access memory and that has access to the cache memory 27.

Figure 6:
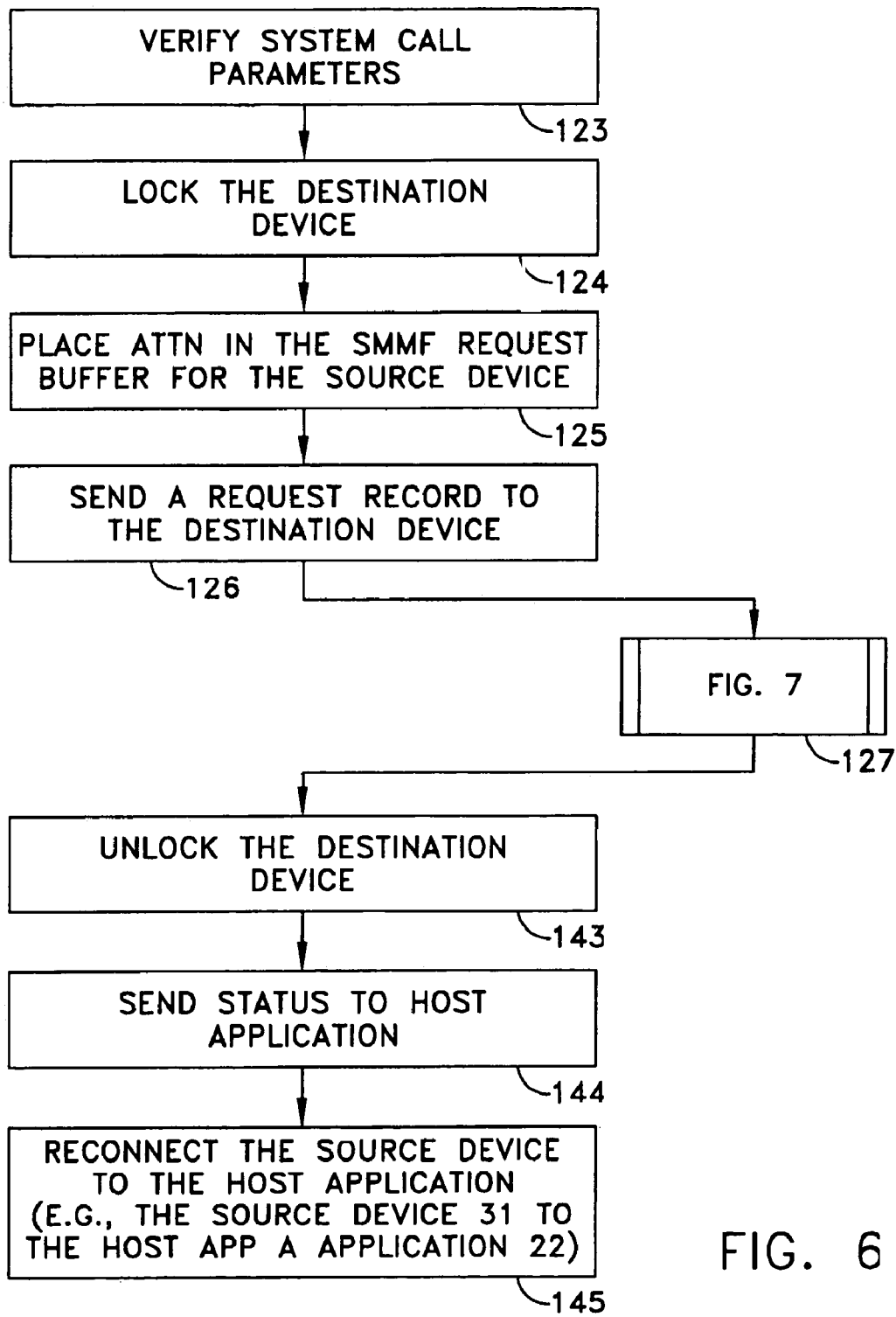
FIG. 6 is a more detailed flow diagram of a portion of the process depicted in FIG. 5.
Figure 7:
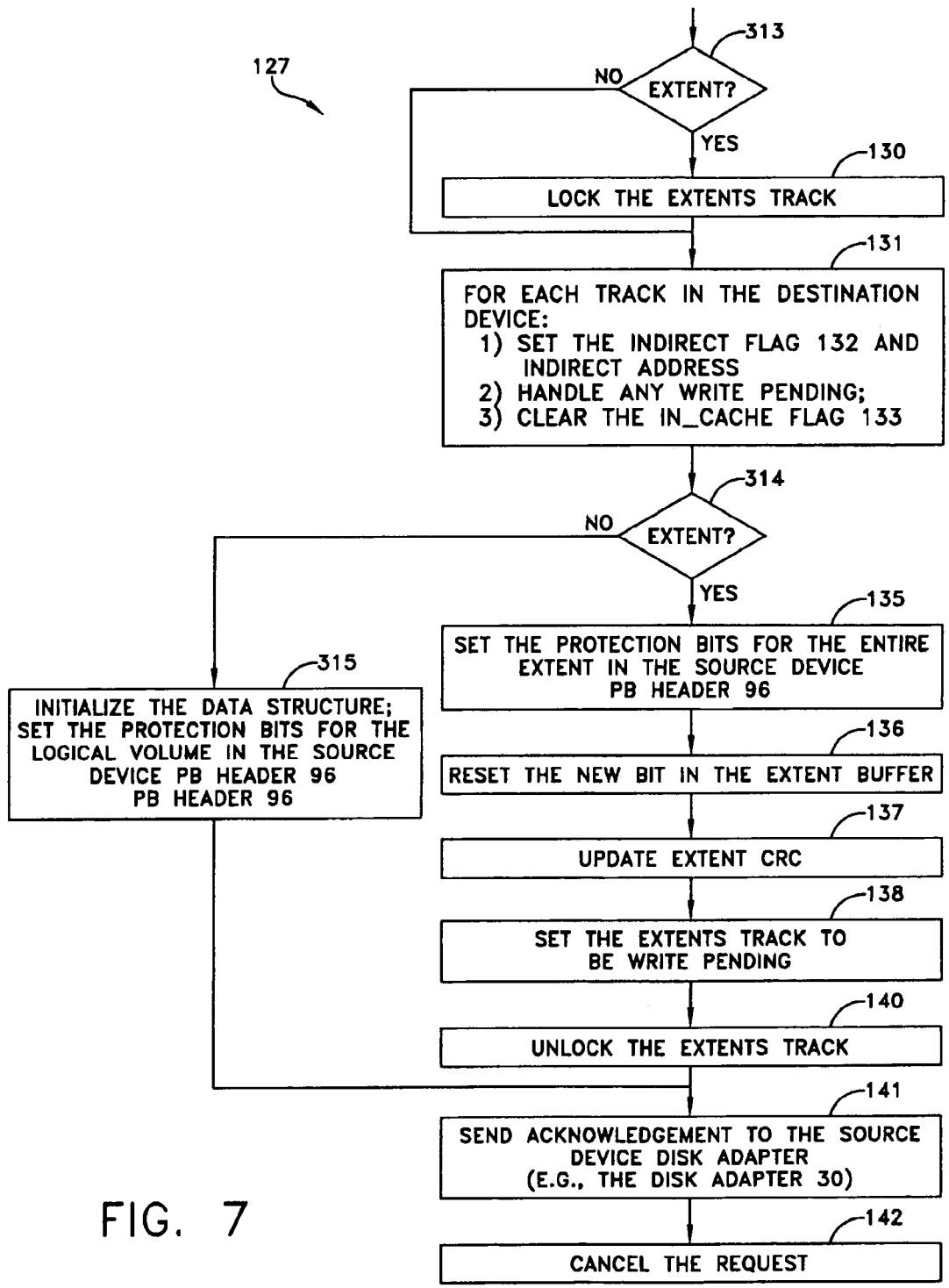
FIG. 7 is a more detailed flow diagram of a portion of the process depicted in FIG. 6.
Figure 8:
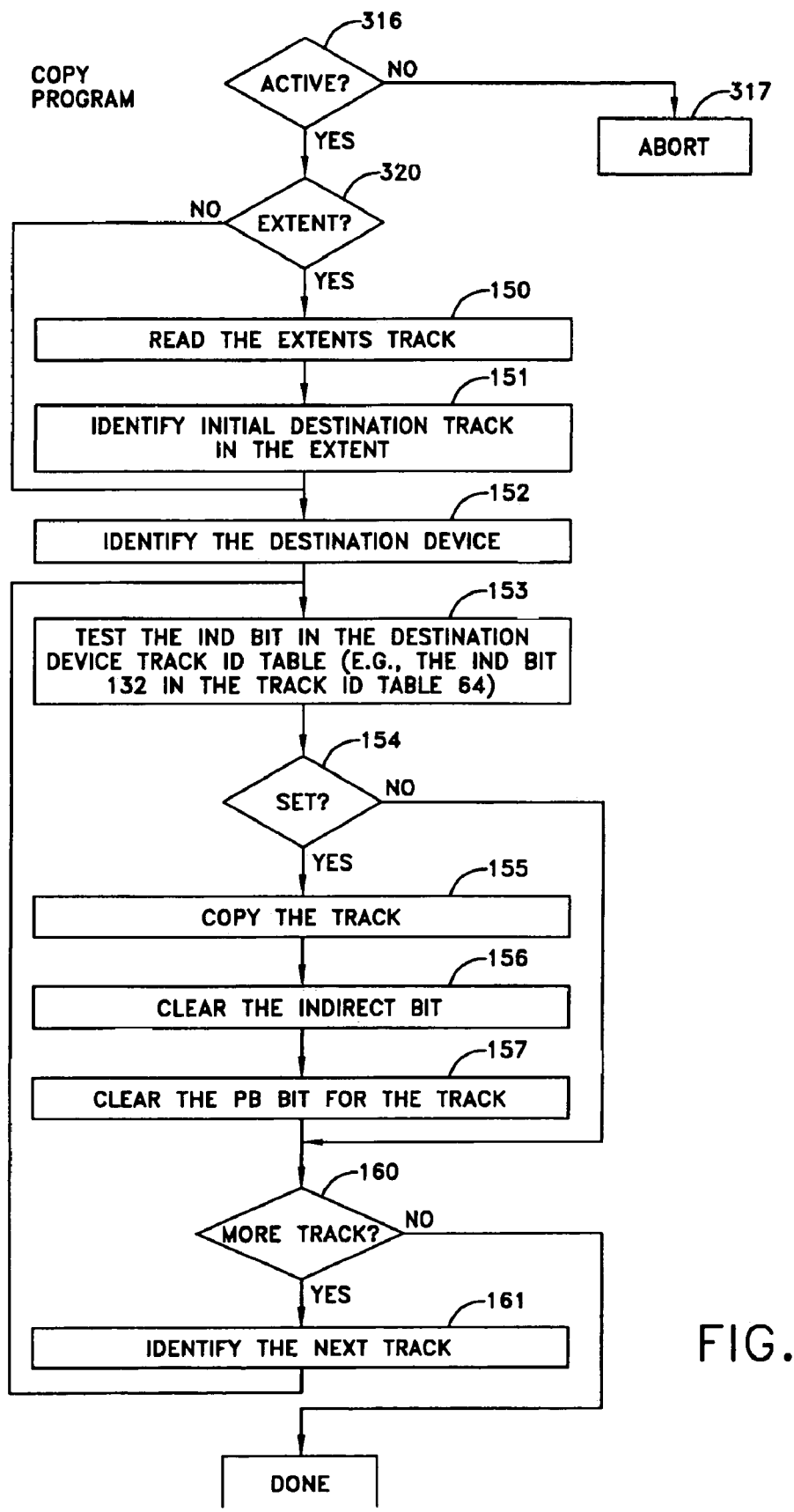
FIG. 8 depicts a copy program that is useful in accordance with this invention.
Figure 9:
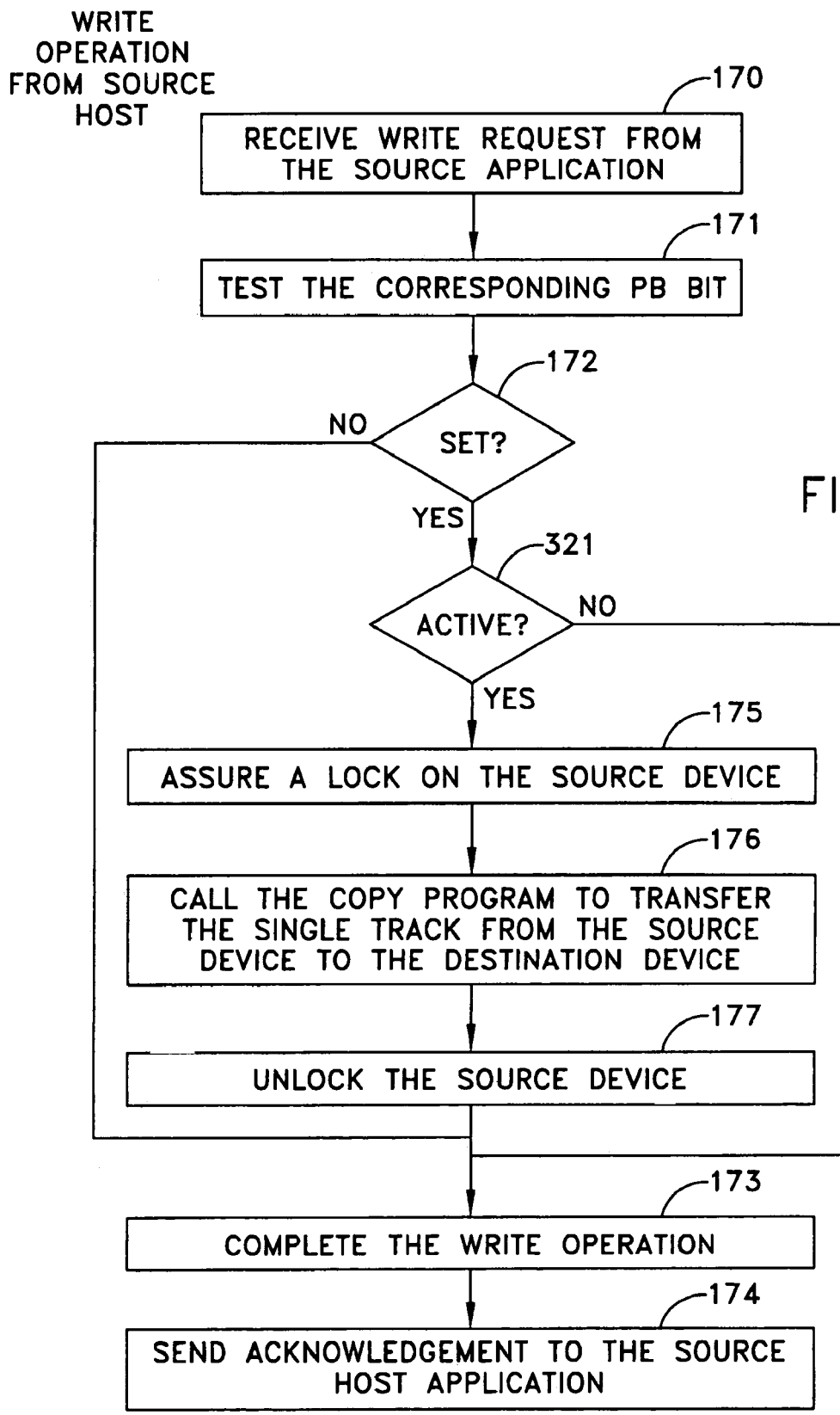
FIG. 9 depicts the response of the system to a write request to a predetermined source storage location.
Figure 10:
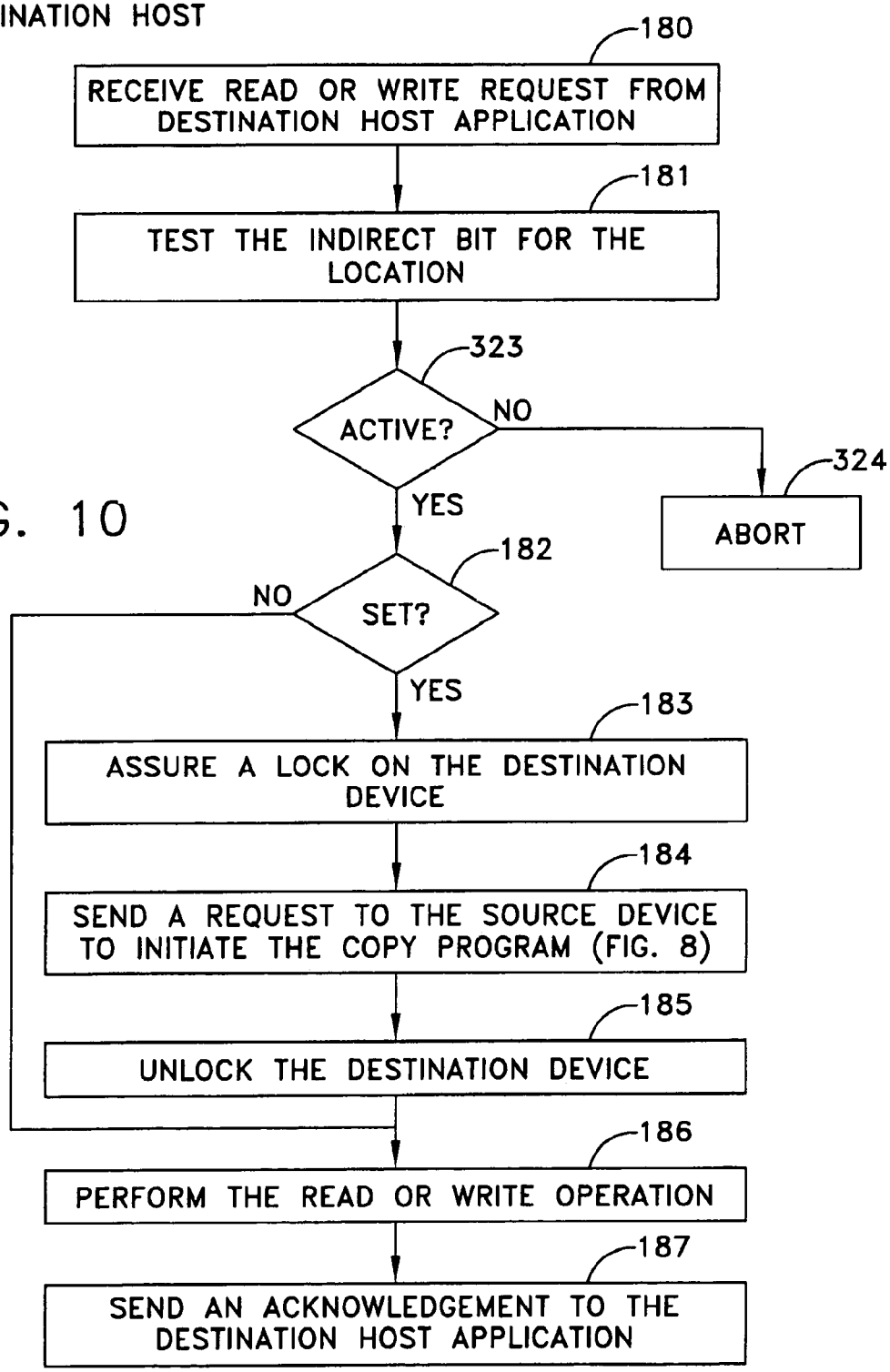
FIG. 10 depicts a response to read and write requests to a predetermined destination storage location.

FIGS. 5 through 9 disclose the steps and procedures conducted during the first operating phase; FIGS. 8 through 10, the second operating phase; and FIGS. 11 and 12, the third operating phase.

FIGS. 5, 7A, 8, 11 and 12 depict the steps for implementing this invention in both mainframe and open system environments. Each of these figures includes one or more decision blocks labeled "EXTENT?". For a mainframe system control always passes from the "YES" branch, for open systems, the "NO" branch. For purposes of explaining the mainframe system, it is assumed that such decision blocks will always exit through the "YES" branch so they are not specifically discussed in conjunction with mainframe operations.

Figure 5:
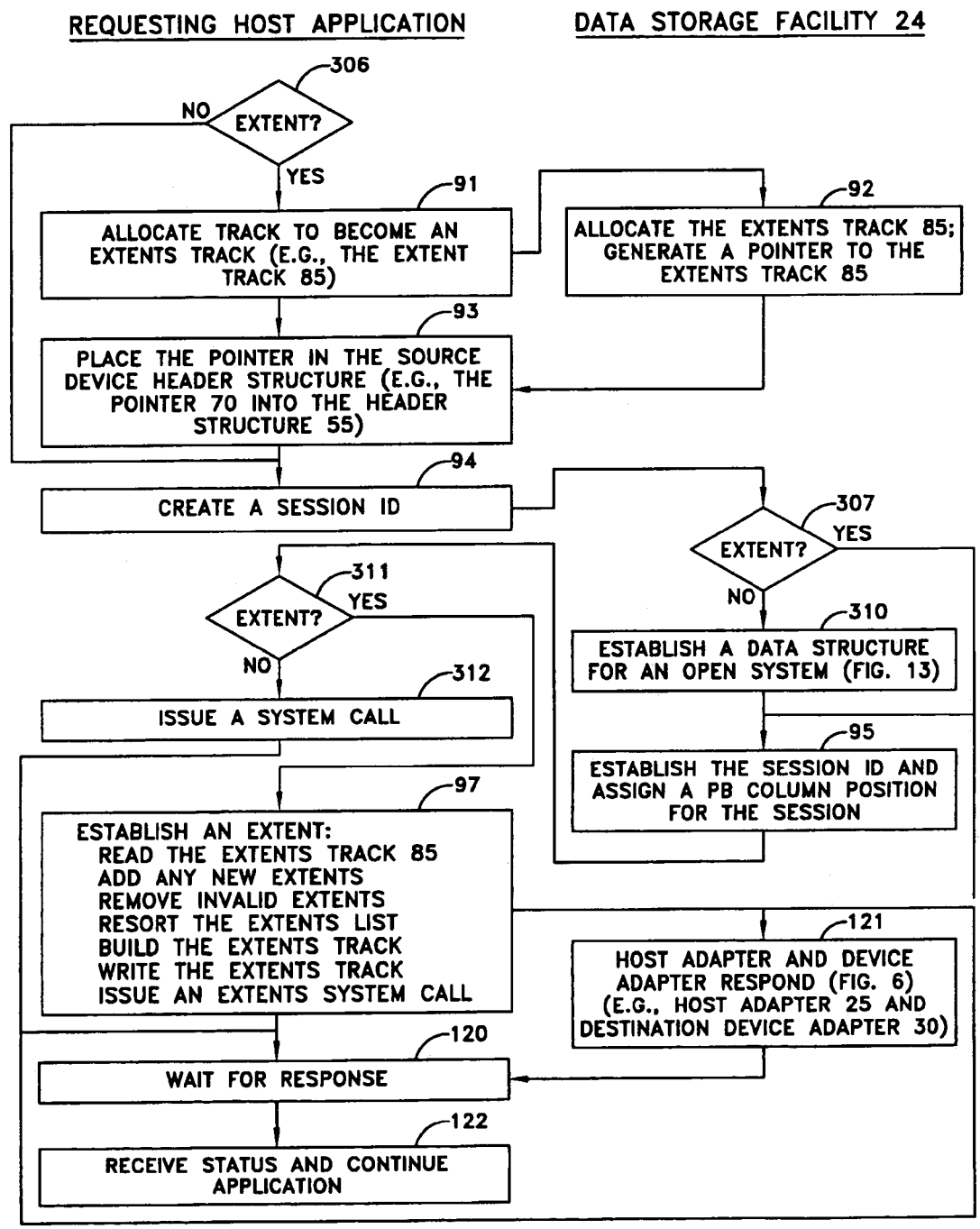
FIG. 5 depicts an interaction between a host array and data storage facility by which the copying occurs in either a mainframe or open system.

When a requesting host application in a mainframe system seeks to copy the file 36 to the storage locations 40, the requesting host application initiates a process 90 in FIG. 5 to interact with the data storage facility 24, particularly the host adapter controller and the device controller associated with the source, such as the controller 86 in the host adapter 26 and the controller 87 in the disk adapter 30 that is designated a source device. An EXTENT decision block 30 transfers control to step 91 wherein the requesting host application allocates a track as an extents track. The controller 87 uses step 92 to allocate that extents track and generates a pointer to that track that is transferred back to the requesting host application. Step 93 in the requesting host application places the pointer in the source device header structure, such as the block 70 in the header for the source device 31 as shown in FIG. 2.

In step 94 the requesting host application begins a process for creating a session ID. A host adapter controller, such as the controller 86 in the host adapter 26, and control transfers to step 95 to establish that session ID number. More specifically, there is associated with each Track ID Table a data block for containing protection bits. The data block can be considered as a two-dimensional array with one row for each track and one column for each session. In the Symmetrix disk array storage systems, each row is 2 bytes wide to define up to 16 sessions. This array is located as PB header 96 on each Track ID table. In the following discussion a particular PB bit position will be identified in the form PB(x,y) where x indicates a track in a cylinder and y indicates a session number. During the session creation in step 95, the controller 87 determines whether any "y" column is available. If one is available, the controller 87 establishes a session identification correlated to the selected PB bit column. This assignment is applied to each PB header 96 associated with the source and destination devices. Establishing separate sessions will enable multiple copying operations to be processed in parallel even with overlapping areas, as for example if it should be desired to copy the file 36 to the DEST A destination device 33 and to copy another subset of data including the file 36 to another destination device.

After a session has been established and the PB column bit has been determined, control passes back to step 97 wherein the requesting host application establishes an extents track. First, the requesting host application reads the extents track, such as the extents track 85 assigned to this particular session. In an initial stage, the extents track will have no data. However, as will become apparent, the process of step 97 can be repeated during a given session. Consequently, step 97 performs various housekeeping operations such as adding any new extents required by the new command or eliminating any previously defined extents that are no longer valid.

Next the requesting host application re-sorts the extents list. In the specific implementation, the extents lists includes addresses in a the cylinder-block-head format as a sort field. Consequently the list is ordered by cylinder and by track for the most efficient transfer of data with minimal requirements for seek operations. Step 97 then builds the extents track according to the structure shown in FIG. 3.

Figure 3:
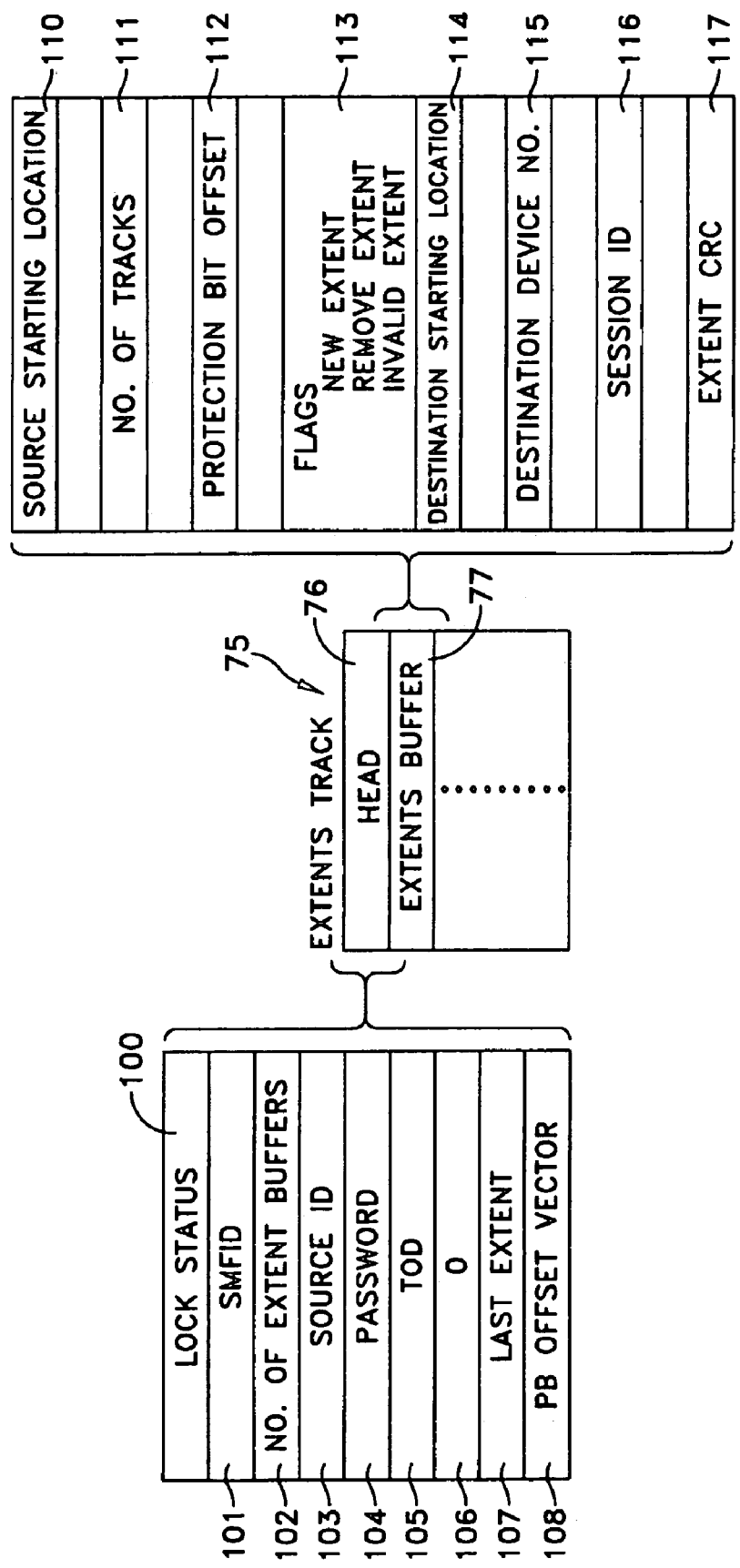
FIG. 3 is a still more detailed view of an extents track in the cache memory of FIG. 2 useful with mainframe systems.

FIG. 3 depicts the data structure 75 identified by EXTENTS TRK PTR pointer 74. This data structure, as previously stated, is available for use in a mainframe system. The header 76 in the extents track includes a lock status entry 100 that indicates whether the extents track is locked. In a multiple host environment an SMFID entry 101 identifies the host application that generated or last updated the extents track 75. Entry 102 identifies the number of extents buffers 77 that are included in the extents track 75. Block 103 identifies the source device, such as the source device 31 in FIG. 1. A password entry 104 enables a host source or destination device to verify requests. A TOD field 105 contains the time at which the extents track was formed. This information is available for use by a host application. A field 106 identifies a first extent that is always 0 to indicate the first record in a track in one embodiment. A last extent entry 107 identifies the last used extent relative to the extent in the first extent entry 106. A PB offset vector entry 108 contains a number of entries that identify the first and last extent elements or buffers for a particular session. Other entries are also included in the header 75, but they, like the entries 101 and 105 provide control information for the host operations and are not relevant to this invention.

Each extents track, such as extents track 75 in FIG. 3, also includes one or more extent buffers, such as the extents buffer 77. In the case of a requesting host application command for transferring the file 36 in source device 31 to the locations 40 in the DEST A device 33, only one extents buffer 77 is included in the extents track. This extents buffer 77 includes a certain amount of information including, from the standpoint of this invention, a source starting location 110. In this particular implementation this is the starting location in the cylinder-block-header address format. Entry 111 includes the number of tracks that will be involved in the copy operation for the extent; that is, the total number of tracks for file 36. A protection bit offset entry 112 identifies the specific PB column position to be monitored for the session.

Each extents buffer 77 includes a flags field 113 including a NEW EXTENT flag that is set when the extents track is initially written; a REMOVE EXTENT flag that is set when it is desired to remove a specific extent; and an INVALID EXTENT flag that is set by the source device controller. The flags field 113 will contain other flags used for purposes that are not relevant to this specific invention.

Entries 114 and 115 collectively define the destination device. Specifically, entry 115 defines the destination device number while entry 114 defines the initial location of the storage locations 40 in the DEST A device 33. Entry 116 stores the session ID and entry 117 contains an EXTENT CRC code for all the preceding bytes in the extents buffer 77.

Referring again to FIG. 5, once step 97 builds the extents tracks, it writes the extent track to the track 85 and then issues an establish extents system call for transfer to the data storage facility 24. After this occurs the requesting host application enters a wait state represented by step 120.

While in the wait state 120, the data storage facility 24, and particularly the destination device controller 88 responds to establish the environment and initiate the copy operation all as shown in FIG. 6. Once this process is completed in step 121, a status is returned to the requesting host application. Step 122 in FIG. 5 receives the status and enables the requesting host application to continue its operation, that may or may not include generating an I/O request to either file copy. For example, the requesting host application could access the file 36 or its copy in the DEST A device 33 at locations 40. Alternatively, the requesting host application may enable a second application, such as the HOST APP B application 23, to access the copy in the destination device such as the copy locations 40 in the DEST B device 33.

When the host adapter in the data storage facility 24, such as the host adapter 26, receives an establish extents system call, the destination device controller, such as the destination device controller 88, receives the system call and verifies various parameters in step 123 of FIG. 6. Such verification might include determining that the first address is a valid address and is the same address as might be recorded in the device header, particularly the device starting location 114 in FIG. 3. Any of a number of other tests may also be performed to verify the context and content of the system call.

Assuming verification, control passes to step 124 wherein the host adapter locks the destination device such as the DEST A device 33. In step 125 the host adapter controller 86 places an ATTN signal in a request buffer for the source device, such as an ATTN flag in the request buffer 72 shown in FIG. 2. Step 126 forms the request record for effecting the data transfer to the destination device. The request record has the data structure shown in FIG. 4 and includes the source device number in block or field 81, the record number of the starting extent in block or field 82 and the record number of the ending extent in block or field 83.

Control then passes to a procedure 127 shown in FIG. 7. If the destination device has mirrored physical devices, a procedure, not described in detail, but known in the art, assures that all the related mirror devices are inactive. Step 130 selects and locks the corresponding extents track so that no additional changes may be made to that extents track. For each track in the destination device, step 131 performs a number of functions. First, it uses the values in the header 61 to determine that the header 61 is associated with a destination device and that an indirect (IND) bit position 132 in each track associated with the destination device is cleared. Then for every destination track step 131 sets that IND flag and sets an indirect address, that is the address of the track in the source device to be copied, to a cache pointer. If there are any pending write operations to the device, they are cleared. More specifically, this implementation of the invention assumes that the requesting host application will take no action to destroy data integrity. With this assumption, any write pending operations are irrelevant because they would be replaced by the copied file. Clearing the write pending flag assures that no such data will overwrite the copied file track. Any in-cache (IC) flag 133 that is set in each destination track is cleared. At this point the system may set a write pending bit to effect a transfer of the extents track to the source device 31.

Once all this information has been transferred to the track ID tables associated with the destination device, control transfers to step 135 to set the protection bits in the session column are set for each track on the entire extent for the source device. Step 136 resets the NEW EXTENT flag in the flags field 113 shown in FIG. 3. The CRC field is then updated in step 137 and the extents track, such as the extents track 75, is set to be write pending in step 132. The destination device controller 88 uses step 140 to unlock the extents track that was locked in step 130. Thereafter another establish extents track system call can alter the extents track. In step 141 the destination device controller 88 sends an acknowledgement to the disk adapter 30 associated with the source device 31. Step 142 cancels the request generated in step 126 of FIG. 6.

Control then passes back to step 143 in FIG. 6 that unlocks the destination device. The host adapter controller 86 then sends status to the host in step 144 and reconnects the source device to the host application, such as the source device 31 to the HOST A APP application 22.

As will now be apparent, the steps of FIGS. 6 and 7 do not produce the physical transfer of any data. However, these procedures establish the operating environment for the copying operation by identifying source and destination storage locations. Nevertheless, when the destination device is unlocked in step 143 and the source device is reconnected in step 145, any host application can alter the file in the source device 31, such as the file 36 and any other application can access data in the file copy stored in locations 40 of the DEST A device 33.

In some applications the copy program is initiated by a system call so control passes to step 150 to read the extents track, such as the extents track 75 in FIG. 3. This begins an ordered copying of data from each track in the source disk storage device to corresponding storage locations in the destination disk storage device on a track-by-track basis. Step 151 uses the data from the extents track 75 to obtain the location of the initial destination track and step 152 identifies the destination device so these two items specifically locate the first destination track within the data storage facility 24 in FIG. 1.

Step 153 is the first step in a loop that tests the IND flag for each track for the defined extent in the destination device, such as the IND flags 132 in the Track ID Table 64 in FIG. 2. This test determines whether it is necessary to copy a specific track from the source to the destination. As will become apparent later in this description, it is possible for other activity to have effected a transfer of an individual track. If the data in the track has not been transferred from the source device to a destination device, step 154 transfers control to step 155 that copies that track, such as from a track in the source device 31 to a corresponding or predetermined track in the DEST A destination device 33. As known, this step 155 also handles any write pendings that may exist at the time of the track transfer. Step 156 clears the IND bit 132 in the destination device and step 157 clears the corresponding PB bit in the header 96 for the track in the source device 31.

Clearing the IND flag assures that an application processing that track in the destination device will not try to copy the track; clearing the PB bit in the source device assures that the track will not be copied if a host application accesses that track in the source device 31. If there are additional tracks to be processed in step 160 control passes to step 161 to identify a next track and the control returns to step 153.

If step 154 determines that the IND bit is not set, no copying occurs and control passes directly to step 160. When all the tracks have been identified in sequence, it is considered that the extent has been transferred and the copy program terminates.

As previously indicated, the second operating phase insures data integrity during the copying process even though a host application can access the source device file 36 or the destination device file 40 before data is actually copied. FIG. 9 depicts the response to a write request from an application, such as occurs when the HOST APP A application 22 writes to the file 36 in source device 31. Read requests are processed in a conventional form as they do not alter the data. For a write request, the host adapter 26 passes the write request to the source disk adapter, such as the source disk adapter 30 for a write to the file 36. The controller 87 receives that request in step 170 and tests the corresponding PB bit associated with the source device in step 171, such as the PB bit in the corresponding header 96 of the source Track ID Table 55. The PB bits in a given column collectively correspond to all the tracks in the device. However, the set bits in a column will identify those files, or other data subsets, that are to be copied. Thus, the PB(s) bit positions constitute, a list of the predetermined source storage locations in the source device. Similarly, the IND bit positions in the destination device Track ID Table provide a list of the predetermined destination storage locations in the destination device.

During a normal operation, if a PB bit in the source device Track ID Table, such as the Track ID Table 56 in FIG. 2, is cleared, the track is either not in the extent or already has been transferred. If the PB bit is cleared or the session is not active, no copying is required. Step 172 diverts to step 173 to complete the write operation in a normal fashion. Step 174 then sends an acknowledgement to the host application that issued the write request, such as the HOST APP A application 22 in FIG. 1.

If the PB bit for a track is set, the track is included in the file and still needs to be transferred, so step 172 transfers control to step 175. Step 175 assures that there is a lock on the source device and uses step 176 to call the copy program of FIG. 8 identifying the single track being written from the source host application. The copy program in FIG. 8 then responds by handling any write pending issues for that track by writing that single track from the source device to the destination device and by clearing the PB(s) bit in the Track ID tables for the source device and the corresponding IND for the destination device. When the copy program completes this one-track transfer, step 177 unlocks the source device so it is again immediately available to any application. Thus FIG. 9 depicts a process for insuring data integrity when a write request to the source file being transferred is received from a host application.

FIG. 10 depicts the operation that occurs when a host application, such as the HOST APP B application 23, as a destination host application seeks to access the destination device, such as the file copy 40 in the DEST A device 33. A controller in the destination device, such as the controller 88 in the DEST A destination device 33, receives read and write requests from the destination host application in step 180. Then the controller 88 uses step 181 to access the corresponding destination device track ID table, such as the track ID table 64, to test the IND bit in the bit position 132. The IND bit position was set if the destination track is part of an extent during the establishment at step 131 in FIG. 7.

If the IND bit is set, it is necessary to immediately perform operations to assure that, in the case of a read request, the data is current or, in the case of a write request, the copy program operating in its normal mode does not overwrite new data. Thus, step 182 transfers control to step 183. Step 183 assures a lock on the destination device. Step 184 then sends a request to the source device to initiate the copy program such as the copy program 84 in the source device disk adapter 30 for the file 36. This request has the basic structure shown in FIG. 4. However, as the request originates in a destination device, the field 81 contains the destination device number and the fields 82 and 83 contain cylinder address and head identifications for the destination device. When that single track has been copied, step 185 unlocks the destination device.

If the IND bit for a track is cleared, the track either is not in an extent or has already been copied. When the condition exists and the session is active, step 182 transfers control to step 186, bypassing steps 183, 184 and 185. Step 186 then performs the read or write operation and sends an acknowledgement to the destination host application in step 187.

Figure 11:
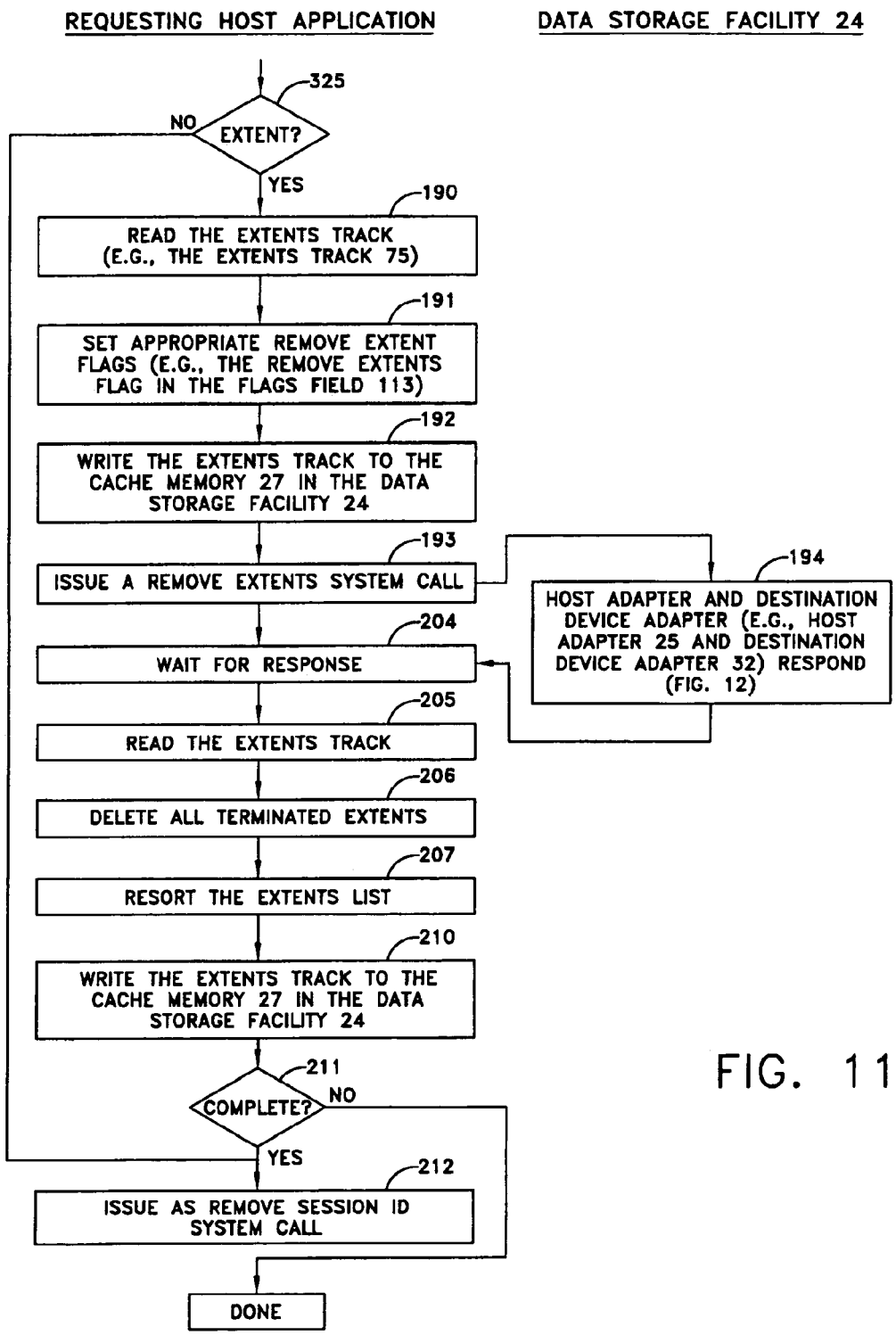
FIG. 11 is a flow diagram of a procedure for removing an extents track that is particularly useful in a mainframe system.

Now referring to the termination/modification phase, FIG. 11 depicts a process for removing an extents buffer from an extents track when the invention is implemented in a mainframe system. First, a requesting host application uses step 190 to read the extents track, such as an extents track 75 in FIG. 3. Next the requesting host application sets the REMOVE EXTENT flag in the corresponding extents buffer 191, such as found in the flags field 113 of FIG. 3. When this is complete, step 192 writes the extents track to the cache memory 27.

In step 193 the requesting host application issues a REMOVE EXTENTS system call.

The host adapter and destination device adapter, such as the host adapter 26 and the destination device adapter 30, respond. Initially the host adapter uses the same process that is depicted in steps 123 through 126 in FIG. 6 and sends the request record to the destination device adapter that responds as shown in FIG. 12.

Figure 12:
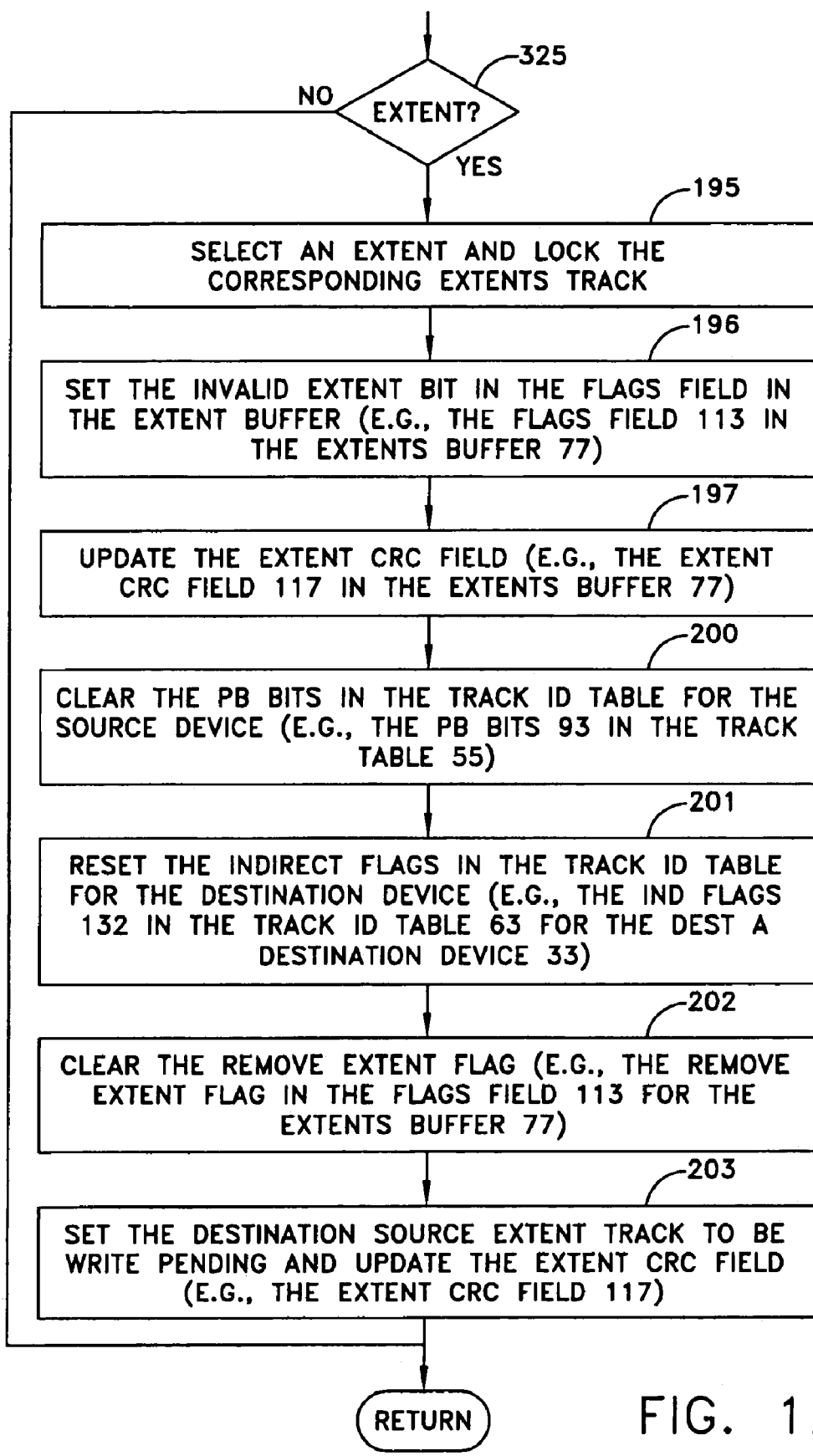
FIG. 12 is a more detailed flow diagram of a portion of the process depicted in FIG. 11.

Referring to FIG. 12, step 195 selects an extent and locks the corresponding extents track so no other application can alter that extents track. Step 196 sets the INVALID EXTENT bit in the flags field for the corresponding extent buffer, such as the INVALID EXTENT flag in the flags field 113 shown in FIG. 3. Step 197 updates the EXTENTS CRC field to maintain data integrity. In step 200 the destination device adapter clears all the PB bits for the source device, such as the PB header 96 with the Track ID table 55 in FIG. 2. Step 201 resets all the IND flags in the Track ID table for the destination device. In the specific example this involves setting the IND flags 132 in the Track ID table 64. In step 202 the controller 88 in the destination disk adapter 30 clears the REMOVE EXTENT flag, such as the REMOVE EXTENT flag in the flags field 113, for the extents buffer 77. Step 203 sets the source extent track to a write pending state to produce an updated copy on the source device 31 and updates the EXTENT CRC field such as the EXTENT CRC field 117 in FIG. 3.

Once the procedure in FIG. 12 is complete, a response is sent to the requesting host that is in wait state represented by step 204 in FIG. 11. This response allows the requesting host application to read the extents track in step 205 for further housekeeping or processing. In step 206 the requesting host application deletes all terminated extents and then resorts the extents list in step 207 as previously described. Step 210 writes the updated extents track to the cache memory 27.

Step 211 determines whether the process is complete. That is, the source device controller 87 tests to determine if all the INVALID EXTENT flags, such as the invalid extent flag in the flags field 113 for the extents buffer 77, have been set. If they have, step 211 diverts to 212 to issue a remove session ID system call before completing operations. Otherwise the process in FIG. 11 terminates without issuing the system call, so the session under which the copy was performed remains active.

Although not shown in a figure, the remove session ID system call for a particular device clears all the PB bits from the associated extents, such as the PB bits in the column position assigned to the session for the source device and makes that PB column or session position available for other uses.

The foregoing discussion describes an operation by which a single file in a single set of contiguous data tracks in a source device are transferred to a contiguous set of tracks in a destination device particularly between the file 36 in the source device 31 and the storage locations 40 in the DEST A destination device 33. There are a wide variety of other transfer variations that can be implemented with this same approach. Indeed it is the foregoing structure and operations that permit more complex data transfers to be made.

For example, file 37 in FIG. 1 is shown as being in two sets of contiguous data track locations, namely locations 37A and 37B. As the file 37 is in a single source device, the establishment of the extents shown in FIGS. 5 through 7 will produce an extents track in the format of FIG. 5 that contains a header, such as the header 76, and two extents buffers 77. The first extents buffer would identify the starting location for the contiguous track 37A and the number of tracks in that set in field corresponding to fields 110 and 111 in FIG. 3. The second extents buffer would include the starting location for the contiguous track 37B and the number of tracks in that contiguous set corresponding to fields 110 and 111. A destination starting location, such as the destination starting location 114, would include the starting track location for the locations 40 in the first extents buffer 77 and a number offset from that starting location by the number of tracks in the first extent for the extents buffer associated with this second set of contiguous tracks.

It is also possible for a single copy command or a succession of copy commands to request the transfer of the file 36 to storage locations 40 and the file 37 to storage locations 41. In this case the establishment of the extents track will again produce a single extents track because both the files 36 and 37 are in non-overlapping locations in the same source device. In the particular embodiment shown in FIG. 1 the extents track 75 will then contain three extents buffers. The first extents buffer will include the information for transferring the file 36 to storage locations 40; the second and third extents buffers, the information for transferring contiguous track sets 37A and 37B to their respective positions and storage locations 40.

Transfers can also be effected within a single session. For example, supposing that in addition to transferring the files 36 and 37 to storage locations 40 and 41 in FIG. 1, it is also desired to transfer a file in storage locations 230 to storage locations in the device 33 to storage locations 231 in the device 35. If this process is defined in a single extents track establishment, the device headers 43 will be modified as shown in FIG. 2 by adding another source device entry for the device 33 identifying the file 230. That new source device will include an extents track that identifies the storage locations 230 and the destination storage locations 231. Thus in this particular embodiment, the logical device 33 acts both as a destination device for receiving the file 36 and as a source device for the file 230 and, as a result of implementing this invention, this more complex transaction still can occur within a single session.

As previously indicated a single session can effect as many transfers as desired limited normally by the space available or assigned for the device headers. However, a single session can not be used to transfer files in which data overlaps. For example, in FIG. 1 if it were desired to transfer file 36 both to storage locations 40 in the DEST A device and storage locations 41 in the DEST B device 35, an overlap would exist. If the extents on a source overlap, different sessions must be used. In such situations separate sessions are used and separate PB column positions will be assigned to resolve any ambiguity in the transfers.

Thus, this invention as described with respect to mainframe systems, provides a method that is particularly adaptable for use in data storage facilities that normally transfer data of a given coarse granularity such as transfers by entire logical volumes. Specifically, this invention allows subsets of that data to be moved thereby eliminating the transfer of irrelevant data.

Open Systems Implementation

The open systems implementation of this invention uses many previously described processes involved with the mainframe systems. In the open systems command the granularity is limited to logical volumes. Operating systems in open systems generally do not have the capability of copying blocks of data on a track-by-track basis with a granularity less than a logical volume because in an open system logical volumes constitute the only level of granularity in which a track-by-track coherence exists. Consequently an open systems command merely needs to define the source by a logical volume identifier, e.g., a device name or number, and the destination by a reference address. Although the command has a different syntax, it still produces the three-phase operation described above. As a result, the organization of the header 51 shown in FIG. 2 is changed to include the data structure 300 shown in FIG. 13. In this data structure a DEST data element 301 contains the initial destination address. An LSC data element 302 identifies the last set cylinder in the source device. That is, during the establishment phase, this data element is set to point to the last cylinder in the source disk storage device for which processing has begun. The initial value will be the location of the first cylinder to be transferred. A TS element 303 provides a time stamp that is useful particularly when large quantities of data are to be copied. An OP data element 304 identifies a particular operation that is occurring. In the context of the command operating phases, the OP data element would indicate whether the device is in the first, or "establish", phase, the second or "copy", phase or the third, or "modification/termination" phase. An OPERATION STATUS data element 305 indicates the status of the operation; for example, whether the copy program is in progress, has been completed or has failed. Together the OP data element 304 and operating status disk element 305 define the state of the copy operation.

Conventionally in an open system it is most likely that a request for a copy operation will be initiated by the source device for purposes of security and control. FIG. 4 therefore is not particularly relevant to the open system implementation.

Now referring to FIG. 5, the first, or establish phase, of the open systems operation is modified because only logical volumes are transferred. There is no need for an extent track. Consequently decision block 306 bypasses steps 91 and 93 and transfers control directly to step 94 to create a session ID.

Figure 13:
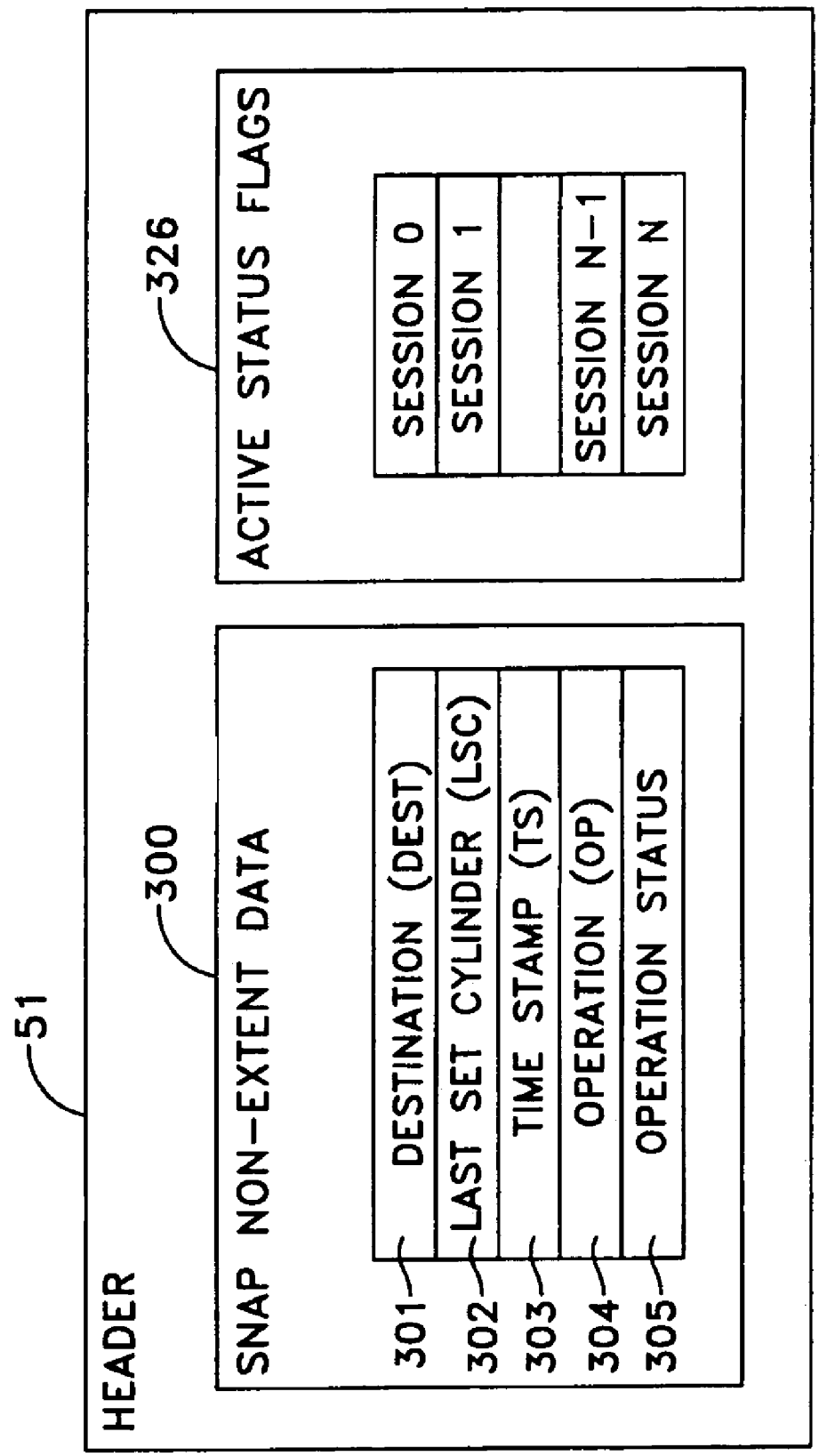
FIG. 13 depicts a header organization for use in the cache memory of FIG. 2 adapted for use with open systems.

When control transfers to the data storage facility in the open system implementation, step 307 introduces an intermediate step 310 to establish and populate the data structure 300 of FIG. 13. Then control passes through step 95 to establish a session ID and assign a PB column position as in a mainframe system application. Control then passes to step 311 that diverts operations to step 312 that issues a system call to complete the establish phase because there is no need to establish an extent in step 97. Then control passes to step 120 to await the response of the host adapter and device adapter to the system call and to step 121 to initiate the operation at the data storage facility 24. When the response is received step 120, step 122 generates an appropriate status message.

Within the data storage facility, the host adapter controller 86 and disk adapter controller 88 operate as shown in FIG. 6 with the only modification to accommodate an open systems implementation occurring in FIG. 7. More specifically in FIG. 7 step 313 bypasses step 130 and transfers control directly to step 131 because no extents track exists. Then as an alternate to steps 135 through 140, step 314 transfers control directly to step 315 to initialize the data structure 300 in FIG. 13. Step 315 also sets the protection bits for the logical volume in the source device PB header 96 like step 135 does. However, there is no longer a requirement to perform any of the functions of steps 136 through step 140. From step 315 control transfers to step 141 to acknowledge the operation and cancel the request in step 152. When the operation completes the establish phase it can then enter the copy phase.

Steps 316 and 317 are introduced to the copy program shown in FIG. 8. As will be described more fully later, it is possible to establish in the operating environment a condition that no copying shall begin until the establish phase has been completed thereby to minimize the use of resources in preparing for a copy program especially when the logical volume is very large. In an open systems environment, the copy program does not require the operations of steps 150 and 151, again because there is no extents track. Assuming the system is active, steps 316 and 320 transfer control directly to step 152 that identifies the destination device and then begins all the other operations of FIG. 8. Those will continue until all the tracks are copied.

A response during the copy phase to a write operation from either the source host or a host at a destination in an open system is exactly the same as described in FIGS. 9 and 10, respectively.

Now referring to the termination/modification phase, in a mainframe system the operations shown in FIG. 11 are required to properly handle the extents track information. Again as there are no extent tracks involved with an open system, step 325 can transfer control directly to step 212 to issue the remove session ID system call. This completes the operation because all the steps in FIG. 12 are bypassed by step 325 in an open systems environment.

Thus it will now be apparent that both implementations of this invention for mainframe systems and open systems provide an improved method for copying data from a source to a destination in a data storage facility. This copying occurs essentially independently of any host process. It also occurs with a minimum interruption to the interaction of the processes operating on the source locations and the initiation of operations with the destination locations.

Time Slice Processing

In FIG. 7 step 131 performs an operation whereby each indirect (IND) flag and each In_Cache flag is set to an initial value and any write pending operations involved for a track are handled for all the tracks to be involved in the transfer. In original implementations of this invention this operation would process all tracks involved in the transfer without interruption. However, as databases and data storage requirements of logical volumes became larger in size, it was possible for step 131 to require significant resources for unacceptably long intervals at the expense of other operations. In accordance with one implementation of this invention two steps are taken to minimize the impact of the operation of step 131 and other steps during a copy operation. First, the "establish" and "copy" phases are separated and require two separate commands from the host application. Thus a basic command may have different arguments or argument values to control the specific process by which copying occurs. Second, procedures for the establish phase are performed as scheduled tasks during a series of time intervals or slices to limit resource utilization.

Figure 14:
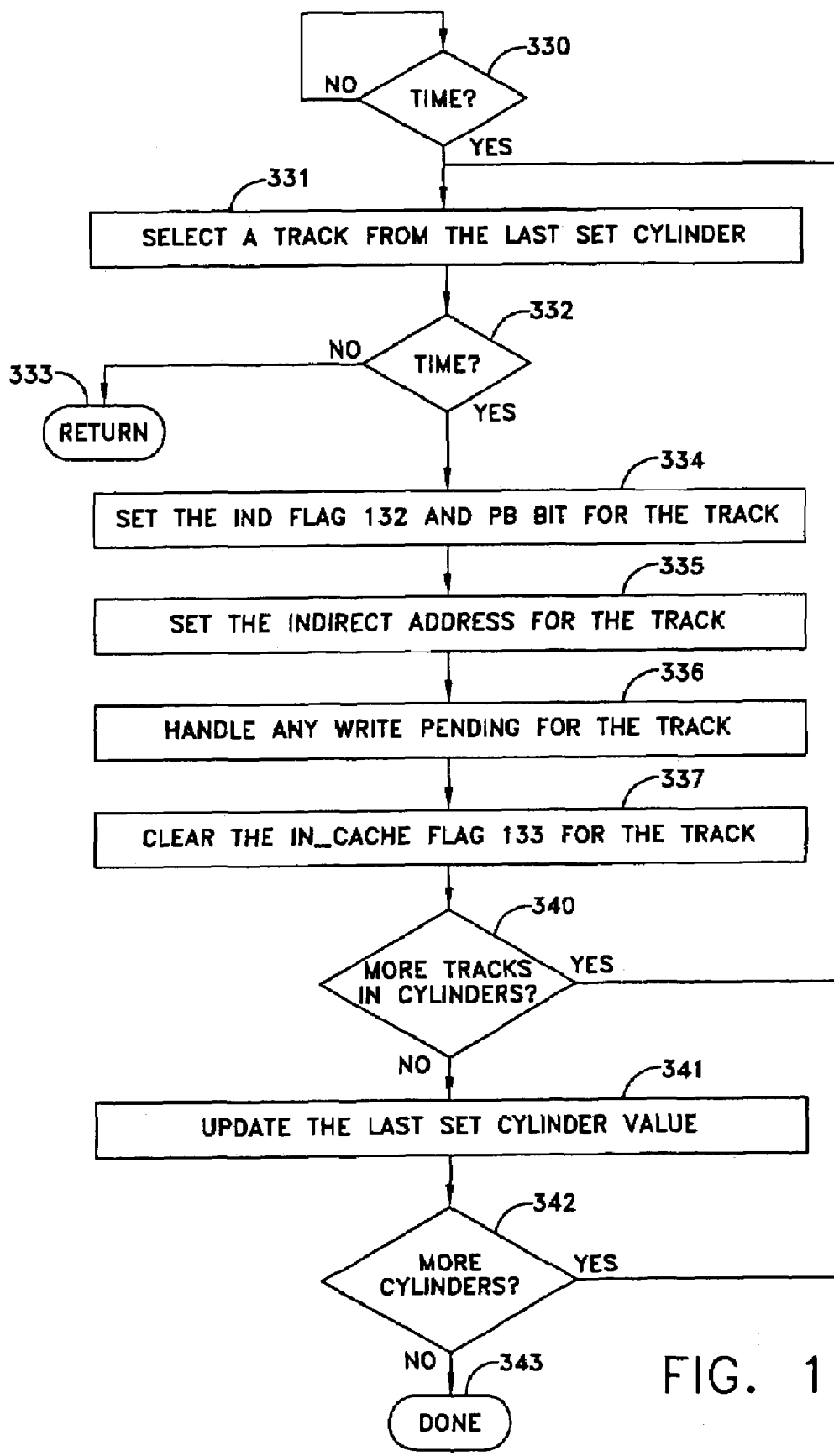
FIG. 14 depicts an alternative method for performing one function shown in FIG. 7.

FIG. 14 depicts the process by which time slice processing occurs. Step 330 represents the process by which a task scheduler determines whether the time window or slice is open. If it is not, no further action occurs.

If the window is open, or slice is active, step 330 transfers control to step 331 to initiate the task in a repetitive or iterative fashion while the time slice is active. Step 331 uses the information in the LSC data element 302 shown in FIG. 13 to identify initially at the beginning of the window the a first cylinder to be processed during a prior time slice. Step 331 selects a track in that cylinder, typically by identifying a read/write head. If the window has closed, control transfers to step 333 to perform a break operation but the cylinder and read/write head identifications are stored.

Initially the time window will still be open, so step 334 sets the IND flag 132 and PB bit for the track. Step 335 sets the indirect address for the track. Step 336 handles any write pending operations for the track. Step 337 clears the IN_CACHE flag 133 for the track. These are the same functions as shown in step 131. However, they only occur for one track during this iteration.

Step 340 then determines whether there are more tracks in the cylinder. If there are, control transfers back to step 331. So long as the window remains open these tasks will continue to be processed in an iterative fashion with each iteration processing one track. If the time window closes, control again transfers from step 332 to step 333 to break the operation. However, the ISC data element 302 in FIG. 13 contains the cylinder address and the selected track identification from step 331 will also be stored as known in the art. Thus when the window again opens the operation begins at exactly the point at which it left off.

When all the tracks in a cylinder have been processed, step 340 transfers control to step 341 to update the LSC data element 302 to point to the next cylinder in the source disk storage device. When all the cylinders have been processed, step 342 terminates the operation. This may include sending a message back to the host application indicating that all the processing has been completed and that the copying programs can begin. This process may also include setting OP data element to indicate an establish operation and setting the operation status data element 305 to a "done" value. If more cylinders require a transfer, step 342 transfers control back to step 331 to select an initial read/write head and thereby define an initial track in the cylinder.

As will now be apparent, the use of the time slice methodology of FIG. 14 provides great flexibility to the system manager because the system manager can control the percent of resources available for the copy operation according to existing conditions in the data processing facility. Also this allows establishment of the environment so copying can begin at a precise point in time.

If the invention is implemented with a separation of the "establish" and "copy" phases, step 342 transfers control to step 343 that issues a message back to the host application. This message indicates completion of the "establish" phase. The application program thereafter can manually or automatically issue a command with arguments indicating that the "copy" phase should begin.

Figure 15:
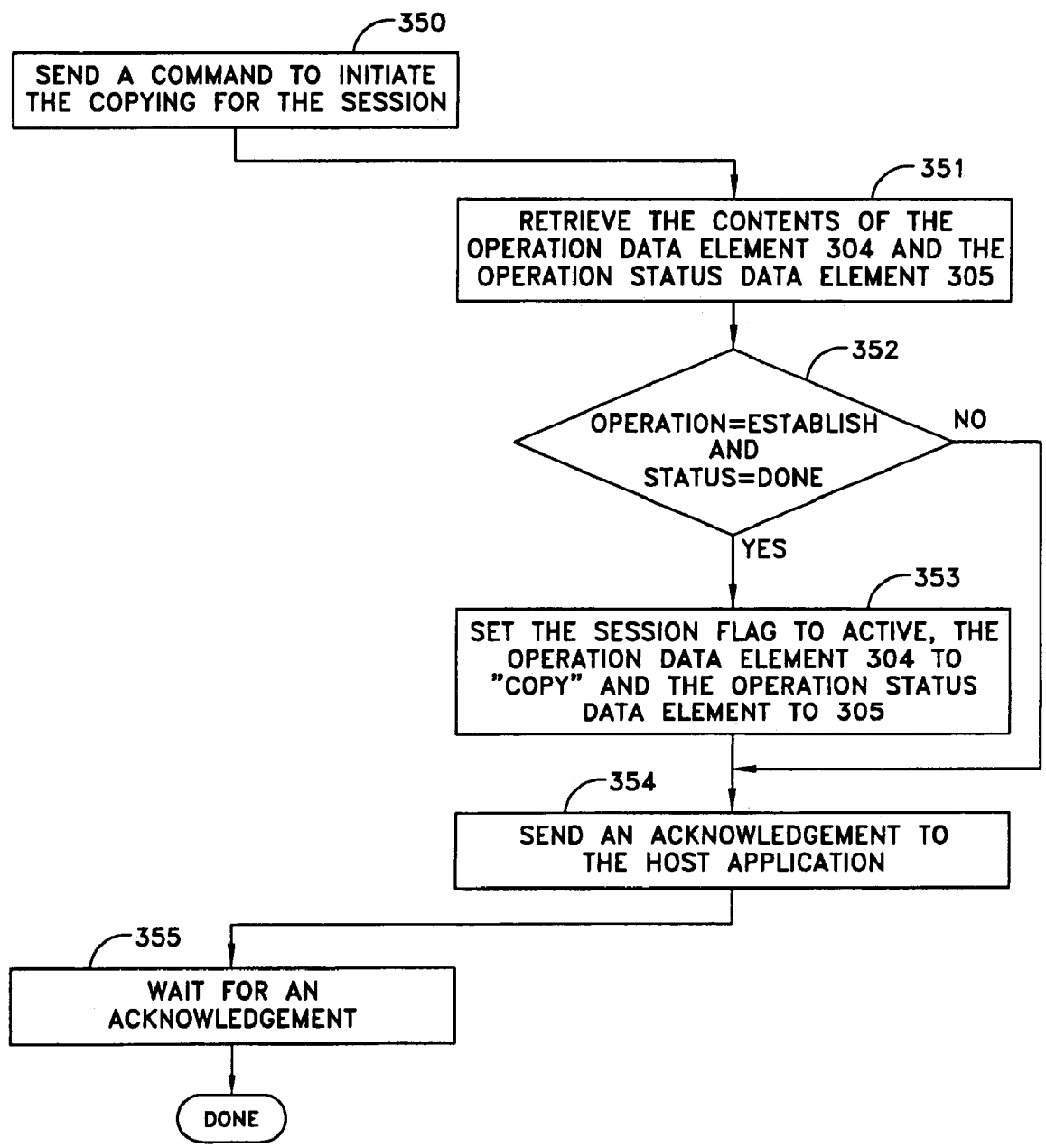
FIG. 15 depicts a method for enhancing the copying process of this invention in larger storage systems.

Step 350 in FIG. 15 represents this function. The data storage facility 24 responds to this command by using step 351 to retrieve from the session data structure 300 the information in the OP data element 304 and the OPERATION STATUS data element 305. These data elements should indicate that the "establish" phase is completed. If they do, step 352 transfers control to step 353 to set a session flag, such as one of the active session flags 326, to an active state. Step 353 also updates the session structure so that the OP data element 304 indicates that the operation has shifted to the "copy" phase. The OPERATION STATUS data element 305 is updated to indicate that the "copy" phase is "in progress". Then step 354 sends an appropriate acknowledgement signal indicating success to the host application. Otherwise step 354 sends an acknowledgement signal indicating that process is terminated because the test in step 352 failed. In either case step 354 then sends an acknowledgement to the host application that processes the acknowledgement in step 355.

The impact of setting an active flag is shown in the copy program and request responses of FIGS. 8 through 10. Specifically if the active flag is hot set, the copy program in FIG. 8 does not begin because step 316 transfers control to step 317 that aborts the copy program. When a write operation is occurring from the host as shown in FIG. 9, step 172 bypasses the sequence that calls the copy program in step 176. The new data is written to the source disk storage device. This is consistent with an approach whereby preprocessing occurs and, for a point-in-time backup, the point-in-time is the instant at which the call for the copying to begin occurs. In the case of a read or write operation from the destination host as shown in FIG. 10, step 323 aborts any read or write operation in step 324. In this situation if the session is not active, then writing data to the destination device may lead to inappropriate information. No data will be copied to the destination device for a read operation. Consequently no read or write operation will occur with the destination device until the copying program is actually operating.

These two features of time slice processing and operating phase separation taken collectively provide a system for copying data that has a minimum or controlled impact on other processor operations and allows the transfer to occur essentially concurrently with other operations. In both the mainframe and open system implementations, multiple commands or command sets can cause transfers of multiple copies of the same or different source data to different destinations. The only limit is whether sessions are available for each such copying operation.

This invention allows transfers to occur in both mainframe and open systems with minimal interruptions to other host applications. As described, the host application is merely dedicated for the purpose of establishing an operating environment for the transfer and steps, such as those shown in FIG. 14, can be used to minimize the impact. Once that environment has been established, a requesting host application is enabled to continue with other processes. It is not prevented from continuing while the actual transfer occurs.

As another advantage, this invention enables an application to request access to the files at the source or the file copy at the destination even during the copying phase. The system provides means for processing the request to preserve data integrity. Moreover, the method permits a host application in a mainframe system to define copy requests that have a range of complexities. A given command can initiate copying of a single file to single destination or copying of multiple files located on multiple physical devices in a data storage facility.

The specific description of this invention has been in terms of two particular implementations with a specific data storage facility with disk data storage devices configuration. Specific flags such as IND flags, have been defined. FIGS. 5 through 15 disclose specific operating sequences. It is understood that the definition of these flags and operating sequences may be altered and others may be eliminated depending upon the configuration and capacities of a particular disk data storage facility with the attainment of some or all of the objectives of this invention. Moreover, the disclosed system is disclosed as an example of a data handling system involving a host and a particular data storage facility. It will be apparent to those of ordinary skill in the art that the basic elements of this invention may be implemented in a wide variety of localized and network environments. disk data storage devices are examples of storage devices with read and write capabilities. This invention may also be applied to storage devices with other read and write media. It might even be applied to a system in which the source storage device contained data in a read only media organized by addressable contiguous blocks. The foregoing and many other modifications can be made to the disclosed system without departing from the invention. Therefore, it is the intent of the appended claims to cover all such variations and modifications as come within the true spirit and scope of this invention.

The invention claimed is:

1. In a data processing system including first and second storage devices and a host device for generating commands during processing of a host application including a command for initiating the copying of data from storage locations in the first storage device, as a source storage device, to storage locations in the second storage device as a destination storage device, a method responding to the command by copying data from the storage locations in the source storage device to the storage locations in the destination storage device, said method comprising the steps in sequence of:
   A) establishing an operating environment by identifying storage locations in the source storage device and storage locations in the destination storage device,
   B) making the identified storage locations in the source and destination storage devices available for use by host applications, and
   C) copying the data from the storage locations in the source storage device to locations in the destination storage device in an ordered manner including, for each storage location in the source storage device:
      i) copying the data from the storage location in the source storage device to the corresponding storage location in the destination storage device, and
      ii) updating information in the operating environment to indicate that the data has been transferred from the source storage device.

2. A method as recited in claim 1 additionally comprising the step of deleting the operating environment after said copying has been completed.

3. A method as recited in claim 2 wherein a host application generates as another command a write request to transfer data from the host application to an identified storage location in the source storage device during said ordered copying, said method including the steps of:
   i) interrupting said ordered copying in response to the write request,
   ii) copying data from the storage location in the source storage device to the corresponding storage location in the destination storage device,
   iii) re-enabling said ordered copying upon completion of said data copying, and
   iv) completing the data transfer to the identified storage location in the source storage device in response to the write request.

4. A method as recited in claim 2 wherein a host application generates as another command one of read and write requests to transfer data between the host application and an identified storage location in the destination storage device during said ordered copying, said method including the steps of:
   i) interrupting said ordered copying in response to the request,
   ii) copying data to the identified storage location in the destination storage device from the corresponding storage location in the source storage device,
   iii) re-enabling said ordered copying upon completion of said data copying, and
   iv) completing the transfer between the host application and the identified storage location in the destination storage device.

5. A data storage facility that connects to a host device that generates commands during processing of host applications wherein said data storage facility is adapted for copying data from a set of source storage locations in a first disk storage device to a set of corresponding destination storage locations in a second disk storage device in response to a predetermined command from a host application identifying source and destination storage locations, said facility comprising:
   A) means responsive to the predetermined command for establishing an operating environment by identifying source and destination storage locations,
   B) means for enabling interaction of commands with the all of said source and destination storage locations and the host applications, and
   C) means for copying the data from said source storage locations to corresponding destination storage locations in an ordered manner, and
   D) means responsive to said copying means for updating the operating environment to indicate data that has been transferred by said copying means.

6. A data storage facility as recited in claim 5 additionally comprising the step of deleting the operating environment after said copying has been completed.

7. A data storage facility as recited in claim 6 wherein a host application generates as one command a write request to transfer data from the host application to an identified source storage location during said ordered copying, said copying means including:
   i) a copy program,
   ii) means for operating said copy program in an ordered copying mode,
   iii) means for interrupting said ordered copying operating means in response to a write request and enabling said copy program to copy data from said identified source storage location to a corresponding destination source location,
   iv) means for re-enabling said ordered copying upon completion of said data copying, and
   v) means for completing the data transfer to said identified source storage location in response to the write request.

8. A data storage facility as recited in claim 6 wherein a host application generates as one command one of read and write requests to transfer data between the host application and an identified destination storage location during the operation of said ordered copying means, said ordered copying means including:
   i) a copy program,
   ii) means for operating said copy program in an ordered copying mode,
   iii) means for interrupting said ordered copying in response to any read and write request to said identified destination source location thereby to enable said copy program to copy data from a corresponding source storage location,
   iv) means for re-enabling said ordered copying upon completion of said data copying, and
   v, means for completing the transfer between the host application and the identified destination storage location.

* * * * *